United States Patent [19]

Fukuki et al.

[11] 3,904,470

[45] Sept. 9, 1975

[54] METHOD FOR BONDING RUBBER TO PLASTICS

[75] Inventors: Takayuki Fukuki; Tamio Matsuura; Noriyuki Takaoka, all of Ichihara, Japan

[73] Assignee: Mitsui Petrochemical Industries, Ltd., Tokyo, Japan

[22] Filed: May 2, 1973

[21] Appl. No.: 356,377

[52] U.S. Cl. ............ 156/306; 156/309; 260/897 A; 260/897 B; 428/516; 428/519; 428/520; 428/521
[51] Int. Cl.$^2$.... C09J 3/12; C09J 3/14; B32B 25/08
[58] Field of Search ....... 156/306, 308, 309, 110 A, 156/297, 306; 161/252, 253, 188, 221, 222, 161/239, 242–243; 260/897 A, 897 B, 889

[56] References Cited
UNITED STATES PATENTS

| | | | |
|---|---|---|---|
| 2,635,975 | 4/1953 | Peters | 161/222 |
| 3,492,372 | 1/1970 | Flanagan | 260/897 A |
| 3,539,525 | 11/1970 | Raimondi | 260/897 A |
| 3,641,215 | 2/1972 | Usamoto et al. | 260/897 A |
| 3,650,874 | 3/1972 | Job et al. | 156/306 |
| 3,758,643 | 7/1973 | Fischer | 260/897 A |
| 3,806,558 | 4/1974 | Fischer | 260/897 A |

FOREIGN PATENTS OR APPLICATIONS

| | | | |
|---|---|---|---|
| 1,043,078 | 7/1965 | United Kingdom | 260/897 |

OTHER PUBLICATIONS

Boenig, Polyolefins–Structures & Properties, Elsevier Publishing Co., 1966, p. 49.

*Primary Examiner*—Charles E. Van Horn
*Assistant Examiner*—Michael W. Ball
*Attorney, Agent, or Firm*—Sherman & Shalloway

[57] ABSTRACT

A method for bonding rubber to plastics by contacting a vulcanized shaped structure of an ethylene/propylene copolymer rubber or an ethylene/propylene/diolefin copolymer rubber with a polyolefin plastic at a temperature above the softening point of said polyolefin plastic, said vulcanized shaped structure consisting of a blend of (i) 60 to 97 % by weight of an ethylene/propylene copolymer rubber having an ethylene content of 40 to 85 mol% or an ethylene/propylene/diolefin copolymer rubber having an ethylene content of 40 to 85 mol% and 0 to 100 %, based on the weight of the copolymer rubber, of a rubber component other than the above copolymer rubbers and a butyl rubber, and (ii) 3 to 40% by weight of specific crystalline polyethylene or polypropylene plastic.

4 Claims, No Drawings

METHOD FOR BONDING RUBBER TO PLASTICS

This invention relates to a method for bonding a shaped structure of an ethylene/propylene copolymer rubber or an ethylene/propylene/diolefin copolymer rubber to a polyolefin plastic with improved bond strength, and especially to a method for bonding them with superior bond strength even at high temperatures.

Various attempts have previously been made to bond a shaped structure of an ethylene/propylene copolymer rubber or an ethylene/propylene/diolefin copolymer rubber, either vulcanized, semi-vulcanized or unvulcanized, to polyolefin plastics at a temperature above the softening points of the polyolefin plastics. For example, such attempts are disclosed in Canadian Pat. No. 745,854, U.S. Pat. No. 3,671,383, U.S. Pat. No. 3,650,874, and British Pat. No. 1,056,414. In these attempts, a composition comprising a blend of rubber with a crystalline polyolefin plastic is not used as the rubber to be bonded with plastics. These prior art techniques have the defect, as will be shown later in this specification by comparative experiments, that good bond strength can be obtained at room temperature, but bond strength at high temperatures is extremely poor, or the bond strength is poor both at room temperature and elevated temperatures.

Extensive work of the inventors, which was made with a view to providing an improved method for bonding a vulcanized shaped structure of rubber to plastics with the elimination of the defects of the prior techniques, has now led to the discovery that the prior art disadvantages can be overcome by contacting [A] a vulcanized structure of a composition consisting of a blend of (i) 60 to 97% by weight, preferably 65 to 95% by weight of a copolymer rubber component consisting of a copolymer rubber selected from the group consisting of an ethylene/propylene copolymer having an ethylene content of 40 to 85 mol% and an ethylene/propylene/diolefin copolymer having an ethylene content of 40 to 85 mol%, and 0 to 100% by weight, based on the weight of said copolymer rubber, of a rubber component other than said copolymer rubbers and a butyl rubber or 0 to 400% by weight, based on the weight of said copolymer rubber, of a butyl rubber, and (ii) 3 to 40% by weight, preferably 5 to 35% by weight, of a crystalline polyolefin plastic selected from the group consisting of a crystalline polyethylene plastic which may contain not more than 10 mol% of units of an α-olefin having three to 10 carbon atoms or vinyl acetate, and a crystalline polypropylene plastic which may contain not more than 10 mol% of ethylene units, with [B] a polyolefin plastic which may contain not more than 10 mol% of a comonomer, at a temperature above the softening point of said polyolefin plastic [B]. It has also been found that this method can give superior bond strength, quality reproductivity and productivity, as compared with a method of bonding which involves a shaped structure of an unvulcanized or semi-vulcanized rubber.

Accordingly, it is an object of this invention to provide an improved method for bonding between a vulcanized shaped structure of an ethylene/propylene copolymer rubber (may sometimes be referred to as EP rubber) or an ethylene/propylene/diolefin copolymer rubber (may sometimes be referred to simply as EPD rubber) and polyolefin plastics.

Many other objects and advantages of this invention will become apparent from the following description.

The objects of this invention can be achieved by contacting the vulcanized shaped structure [A] of a composition consisting of (i) and (ii) with the polyolefin plastic [B] at a temperature above the softening point of the plastics [B].

The copolymer rubber component (i) used in this invention is an EP rubber having an ethylene content of 40 to 85 mol% or an EPD rubber having an ethylene content of 40 to 85 mol%. The component (i) may contain 0 to 100% by weight, based on the weight of the EP rubber and/or EPD rubber, of an other rubber component (where the other rubber component is a butyl rubber, the amount is 0 to 400% by weight). When the ethylene content is outside the ranges specified above, the EP copolymer or EPD copolymer does not have properties inherent to rubber and is not suited for use in the present invention.

Examples of the diolefin as a constituent unit of the EPD rubber are isoprene, butadiene, dicyclopendatiene, 1,4-pentadiene, 2-methyl-1,4-pentadiene, 1,4-hexadiene, divinyl benzene, methylidene norbornene, and ethylidene norbornene. These compounds may be used in admixture of two or more. It is preferred that the diolefin be used in an amount of about 0.5 to 10 mol% based on the EPD rubber.

Examples of the other rubber components that can be used in an amount of not more than 100% by weight based on the weight of the EP rubber and/or EPD rubber are natural rubber, SBR (styrene/butadiene rubber), butyl rubber. If the amount of the other rubber components exceeds 100% by weight (400% by weight when the other component is butyl rubber), it gives an adverse effect on the bond strength of the final product and also causes a reduction in weatherability.

Two or more of the other rubber components may be used in admixture.

The crystalline polyolefin plastic which forms the blended composition [A] with the copolymer rubber component is a crystalline polyethylene plastic which may contain not more than 10 mol% of α-olefin units having three to 10 carbon atoms or a crystalline polypropylene plastic which may contain not more than 10 mol% of ethylene units. As the α-olefin having three to 10 carbon atoms, propylene and butene-1 are preferred. When this component is lacking, the object of this invention cannot be achieved.

The vulcanized structure of the blended composition comprises 60 to 97% by weight, preferably 65 to 95% by weight, of the copolymer rubber component (i) and 3 to 40% by weight, preferably 5 to 35% by weight, of the crystalline polyolefin plastic component (ii). If the amount of the component (ii) is less than 3% by weight, the intended improvement in bond strength cannot be achieved. If, on the other hand, it exceeds 40% by weight, the physical properties of the vulcanized shaped structure become poor.

There is no specific restriction on the means of blending the copolymer rubber component (i) with the crystalline polyolefin plastic component (ii). It is only necessary to mix them uniformly at a temperature above the softening point of the component (ii). For example, the blending can be performed by roll mixing, or by using a Banbury's mixer. The vulcanization of the shaped structure of the blended composition can be performed by any known means. For example, a vulcanization agent is incorporated into the blended composition, and if desired, a vulcanization activator, a reinforcing agent such as carbon black or silica, a filler or a softener may be added thereto. The composition is heated to the vulcanization temperature during or after shaping. The heating temperature can be varied according to the type of the vulcanizer used, but is generally from 140° to 250°C. The vulcanizing agent may be a peroxide, sulfur or ionizing radiation. The compounding of the vulcanizing agent and other compounding ingredients can be easily made by using a conventional rubber masticating machine such as an open mill or Banbury's mixer.

Specific examples of the vulcanizing agents are dicumyl peroxide, 2,5-dimethyl-2,5-di(tert.-butylperoxy) hexane, 2,5-dimethyl-2,5-di(benzoylperoxy) hexane, and 2,5-dimethyl-2,5-di(tert.-butylperoxy) hexane-3 when EP rubber is used. It is possible to use conjointly a vulcanizing agent and/or co-agent such as sulfur; aforesaid peroxide; quinone dioxime compounds such as p-quinonedioxime; methacrylate compounds such as polyethylene glycol dimethacrylate; allyl compounds such as diallyl phthalate or triallyl cyanurate; maleimide compounds; and divinyl benzene. Where EPD rubber is used, sulfur-containing vulcanizing agents such as sulfur, tetrathiuram disulfide or dipentamethylene thiuram tetrasulfide can be conveniently used. Where sulfur is used, a vulcanization accelerator is usually employed. Examples of the vulcanization accelerator are thiuram compounds such as tetrathiuram monosulfide, dithioacid salts such as zinc dimethyl dithiocarbamate, and thiazole compounds such as N-cyclohexyl-2-benzothiazole sulfenamide or 2-mercaptobenzothiazole.

Usually, such a vulcanizing agent or curing assistant is used in an amount of 0.5 to 10% by weight, preferably 1 to 4% by weight, based on the weight of EP rubber and/or EPD rubber. The amount of the reinforcing agent, filler or softening agent is also arbitrary, for example, 30 to 200% by weight.

In the method of the present invention, the vulcanized shaped structure [A] of the blended composition described above is contacted with the polyolefin plastic [B] which may contain not more than 10 mol%, preferably not more than 5 mol%, of a comonomer at a temperature above the softening point of the plastic [B]. Preferred examples of the polyolefin plastic [B] are polyethylene, polypropylene, polybutene-1, a copolymer of not more than 10 mol% of ethylene and not less than 90 mol% of propylene, a copolymer of not more than 10 mol% of propylene and not less than 90 mol% of ethylene, and a copolymer of not more than 10 mol% of vinyl acetate and not less than 90 mol% of ethylene and a saponified product thereof.

The kind of the crystalline polyolefin plastic component (ii) used for the preparation of the blended composition may or may not be the same as that of the polyolefin plastic [B].

The form of the polyolefin plastic [B] to be contacted with the vulcanized shaped structure [A] of the blended composition consisting predominantly of EP rubber and/or EPD rubber is not particularly restricted, and it may be in the form of molding powder of pellet, melt, or sheet, etc. It is most preferred to contact the polyolefin plastic [B] in the molten state with the vulcanized structure [A]. Other arbitrary means can be employed in the present invention. For example, the polyolefin plastic [B] can be contacted and bonded with the vulcanized shaped structure [A] by compression molding, injection molding, extrusion molding, blow molding, etc.

One example of the bonding procedure involves placing the vulcanized shaped structure [A] in a mold, and compressing, injecting or extruding a melt of the polyolefin plastic [B] heated to a temperature above the softening temperature of the polyolefin plastic [B], for example, to 150° – 300°C. at a compression pressure of 20 – 100 Kg/cm², an injection pressure of 800 – 1,300 Kg/cm², or an extrusion pressure of 20 – Kg/cm² using a compression molding machine, an injection molding machine or extruder, respectively, followed by cooling and solidifying the molded product thereby to bond the vulcanized shaped structure [A] to the polyolefin plastic [B].

In another example, the polyolefin plastic [B] in the molten state may be continuously contacted with the vulcanized shaped structure [A] to bond them continuously.

Furthermore, a sheet, powder or pellet of the polyolefin plastic [B] may be interposed between two layers of the vulcanized shaped structure [A], and by heating the assembly under pressure to a temperature above the melting point of the polyolefin, the vulcanized structures [A] consisting mainly of EP rubber or EPD rubber can be firmly bonded to each other through a layer of the polyolefin plastic [B]. This has made it possible to overcome the difficulty of bonding between ethylene copolymer rubbers.

The invention will be described more specifically by the following Examples which are presented for illustrative, rather than, limitative purposes.

EXAMPLES 1 TO 10 AND COMPARATIVE
EXAMPLES 1 TO 6

A crystalline polyolefin indicated in Table 1 was kneaded with an ethylene/propylene/dicyclopentadiene rubber (EPD rubber, ethylene content 67 mol%) in the proportions indicated in Table 1, using a 20-cm open mill. The compounded mixture was press vulcanized for 30 minutes at 160°C. to form a vulcanized rubber sheet having a length of 13 cm, a width of 11 cm and a thickness of about 0.25 cm. A polyolefin indicated in Table 1 was press formed at 200°C. to form a polyolefin sheet having substantially the same size as the vulcanized rubber sheet. The surface of the vulcanized rubber sheet was wiped with acetone to remove the surface contamination, and the sheet was then superposed on the polyolefin sheet. The superposed assembly was placed in a mold having a length of 13 cm, a width of 11 cm and a depth of 0.4 cm, and held on both sides with hot plates kept at 200°C. It was then pressed for 4 minutes at 50 Kg/cm², and cooled. Two test pieces having a width of 2.5 cm were cut out from the resulting bonded composite of the polyolefin and the rubber.

Each of the test pieces was pulled apart into constituent sheets upwardly and downwardly in a direction at 180°C. at a rate of 50 mm/min. at 25°C. and 70°C., respectively, and the bond strength per 2.5 cm width was measured. The results are shown in Table 1.

For comparison, the same procedure as above was repeated except that the crystalline polyolefin was not incorporated in the rubber or incorporated in an excessive amount, or an amorphous polyolefin plastic or paraffin wax was used instead of the crystalline polyolefin as a component of the blended composition [A].

| Run No. | Rubber blended composition [E] RPD rubber (wt.%) | Crystalline polyolefin plastics Type | wt.% | Polyolefin plastics [B] to be bonded | Bond strength (Kg/2.5 cm) 25°C. | 70°C. |
|---|---|---|---|---|---|---|
| Comparative Example 1 | 100 | Polyethylene | 0 | Polyethylene | 2 | less than 1 |
| Comparative Example 2 | 97.5 | " | 2.5 | " | 4 | 2 |
| Example 1 | 93 | " | 7 | " | 10 | 6 |
| Example 2 | 85 | " | 15 | " | 12 | 8 |
| Example 3 | 75 | " | 25 | " | 14R* | 10R |
| Example 4 | 65 | " | 35 | " | 14R | 10R |
| Comparative Example 3 | 100 | " | 0 | Polypropylene | 3 | less than 1 |
| Comparative Example 4 | 97.5 | " | 2.5 | " | 4 | 2 |
| Example 5 | 90 | " | 10 | " | 11 | 7 |
| Example 6 | 65 | " | 35 | " | 14R | 10R |
| Example 7 | 90 | Polypropylene | 10 | " | 11 | 8 |
| Example 8 | 65 | " | 35 | " | 14R | 10R |
| Example 9 | 80 | Polyethylene | 20 | " | 14R | 10R |
| Example 10 | " | Polypropylene | " | Polyethylene | 14R | 10R |
| Comparative Example 5 | " | Amorphous polypropylene | " | " | 8 | 2 |
| Comparative Example 6 | " | Paraffin wax (m.p. 68–70°C.) | " | " | 8 | 2 |

*This indicate the occurrence of the breakage of rubber.

It is seen from the results obtained that the addition of the crystalline polyolefin to EPD rubber contributed to a marked improvement on the bonding of a vulcanized rubber shaped structure consisting mainly of EP rubber and/or EPD rubber to the polyolefin plastics.

The following compounding ingredients were added to the rubber blended composition [A] in the amounts indicated per 100 parts by weight of the EPD rubber.

| | | |
|---|---|---|
| Zinc oxide | 5 | parts by weight |
| Stearic acid | 1 | |
| FEF carbon black | 30 | |
| SRF carbon black | 30 | |
| Naphthenic oil | 20 | |
| Dixie clay (product of R.T. Vanderbilt Co.) | 40 | |
| BZ (zincadimethyldithiocarbamate) | 1.5 | |
| TT (tetramethyl thiuram disulfide) | 0.5 | |
| M (2-mercaptobenzothiazole) | | |
| Sulfur | 1 | |

EXAMPLES 11 TO 16 AND COMPARATIVE EXAMPLES 7 TO 9

The same procedure as in Examples 1 to 10 was repeated except that the rubber blended compositions and the polyolefin plastics to be bonded were changed as shown in Table 2. In each of these examples, 80% by weight of component (i) was blended with 20% by weight of component (ii). The results of the bond strength test are shown in Table 2.

| Run No. | [A] Vulcanized Shaped Structure of Rubber Blend Composition (i) Copolymer rubber component EPD rubber (ethylene content 67 mol%) | Other rubber type | Amount (wt% based on EPD rubber) | (ii) Crystalline polyolefin plastics | [B] Polyolefin plastic to be bonded | Bond Strength (Kg/2.5cm) at 25°C. | at 70°C. |
|---|---|---|---|---|---|---|---|
| Example 11 | Ethylene-propylene-dicyclopentadiene | Natural rubber | 100 | Polyethylene | Polyethylene | 5R | 3R |
| Comparative Example 7 | " | " | 500 | " | " | 2 | 1 |
| Example 12 | " | SBR | 100 | " | " | 4 | 2 |
| Comparative Example 8 | " | " | 500 | " | " | 1 | less than 1 |
| Example 13 | " | Butyl rubber | 100 | " | " | 12R | 9R |
| Example 14 | " | " | 200 | " | " | 9 | 7 |
| Comparative Example 9 | " | " | 500 | " | " | 2 | 1 |
| | | | | | Polyethylene con- | Polyethylene con- | |

Table 2 – Continued

| Run No. | [A] Vulcanized Shaped Structure of Rubber Blend Composition | | | | [B] Polyolefin plastic to be bonded | Bond Strength (Kg/2.5cm) | |
|---|---|---|---|---|---|---|---|
| | (i) Copolymer rubber component | | | (ii) Crystalline polyolefin plastics | | at 25°C. | at 70°C. |
| | EPD rubber (ethylene content 67 mol%) | Other rubber type | Amount (wt% based on EPD rubber | | | | |
| Example 15 | '' | — | — | taining 5 mol% of propylene | taining 5 mol% of propylene | 11 | 8 |
| Example 16 | Ethylene-propylene ethylidene norbornene | — | — | Ethylene-vinyl acetate copolymer having a vinyl acetate content of 8 mol% | Ethylene-vinyl acetate copolymer having a vinyl acetate content of of 8 mol% | 10 | 7 |

EXAMPLE 17

A compounded mixture was prepared using a 20 cm open roll in accordance with the following recipe.

| | |
|---|---|
| EP rubber (Dutral Co., product of Montedison) | 100 parts by weight |
| Zinc oxide | 5 |
| Stearic acid | 1 |
| Mistron Vapor Talc (product of Sierra Talc Co.) | 70 |
| Dixie clay | 70 |
| Naphthenic oil | 20 |
| Low pressure polyethylene (Hizex, 2100 J, product of Mitsui Petrochemical Co.) | 20 |
| Dicumyl peroxide | 2 |

The compounded mixture was press vulcanized for 30 minutes at 160°C. to form a vulcanized rubber sheet having a length of 13 cm, a width of 11 cm and a thickness of about 0.25 cm. The rubber sheet obtained was bonded to a low pressure polyethylene sheet under the same conditions as shown in Example 1, and the bond strength of the bonded composite was measured in the same way as shown in Examples 1 to 10. The rubber broke when the bond strength was 7 Kg/25 mm. at 25°C. and 4 Kg/25 mm at 70°C.

COMPARATIVE EXAMPLE 10

The procedure of Example 1 was repeated except that a styrene/butadiene copolymer rubber was used instead of the EPD rubber. The bonded composite was separated into the constituent sheets at a bond strength of 2 Kg/25 mm at 25°C.

COMPARATIVE EXAMPLE 11

The EPD rubber blended composition obtained in Example 1 was formed into a rubber sheet without prior vulcanization. The sheet was superposed on the same polyethylene sheet as used in Example 1, and the assembly was pressed under the same conditions as in Example 1. The bond strength of the bonded composite was measured, and found to be less than 1 Kg/25 mm at 25°C.

EXAMPLE 18

The ethylene/propylene/diolefin copolymer rubber vulcanized product containing polyethylene incorporated therein as obtained in Example 9 was formed into a sheet having a thickness of 1 mm. A 0.2 mm thick polyethylene (Mirason 67) was interposed between two such sheets, and the assembly was pressed for 1 minute at 200°C., followed by cooling. A 2.5 cm width test piece was cut away from the bonded composite, and pulled apart into the constituent sheets in a direction at 180°C. at a speed of 50 mm/min. The bond strength was found to be 7 Kg/2.5 cm at 25°C.

When the same procedure as above was repeated without incorporating polyethylene into the copolymer rubber, the bond strength of the resulting bonded composite was 3 Kg/2.5 cm at 25°C.

What we claim is:

1. A method for bonding rubber to plastics by contacting a vulcanized shaped structure of an ethylene/propylene copolymer rubber or an ethylene/propylene/diolefin copolymer rubber with a polyolefin plastic at a temperature above the softening point of said polyolefin plastic, which comprises contacting [A] a vulcanized shaped structure of a composition consisting of a blend of (i) 60 to 97% by weight of a copolymer rubber component consisting of a copolymer rubber selected from the group consisting of an ethylene/propylene copolymer rubber having an ethylene content of 40 to 85 mol% and an ethylene/propylene/diolefin copolymer rubber having an ethylene content of 40 to 85 mol% and 0 to 100%, based on the weight of the copolymer rubber, of a rubber component other than the above copolymer rubbers and a butyl rubber, or 0 to 400%, based on the weight of the copolymer rubber, of a butyl rubber and (ii) 3 to 40% by weight of a crystalline polyolefin plastic component selected from the group consisting of a crystalline polyethylene plastic which may contain not more than 10 mol% of α-olefin units with three to 10 carbon atoms or vinyl acetate, and a crystalline polypropylene plastic which may contain not more than 10 mol% of ethylene units, with [B] a polyolefin plastic which may contain not more than 10 mol% of units of a comonomer, at a temperature above the softening point of the polyolefin plastic [B].

2. The method of claim 1 wherein said composition consists of 65 to 95% by weight of component (i) and 5 to 35% by weight of component (ii).

3. The method of claim 1 wherein said polyolefin plastic [B] is a member selected from the group consisting of polyethylene, polypropylene, polybutene-1, a copolymer of not more than 10 mol% of ethylene and not less than 90 mol% of propylene, a copolymer of not more than 10 mol% of propylene and not less than 90 mol% of ethylene, a copolymer of not more than 10 mol% of butene-1 and not less than 90 mol% of ethylene, a copolymer of not more than 10 mol% of vinyl acetate and not less than 90 mol% of ethylene, and a saponification product of said vinyl acetate/ethylene copolymer.

4. The method of claim 1 wherein said α-olefin is propylene or butene-1.

* * * * *